United States Patent

Boroughs et al.

[15] 3,670,888

[45] June 20, 1972

[54] METHOD OF SEPARATION OF WAX FROM OIL

[72] Inventors: Raymond Milton Boroughs, Walton-on-Thames; John Wilson Redman, Horsham, both of England

[73] Assignee: The British Petroleum Company Limited, London, England

[22] Filed: Dec. 30, 1970

[21] Appl. No.: 102,985

[30] Foreign Application Priority Data

Jan. 7, 1970    Great Britain........................795/70

[52] U.S. Cl...................................210/71, 210/78
[51] Int. Cl..........................................B01d 21/26
[58] Field of Search................................210/71.78

[56] References Cited

UNITED STATES PATENTS 2,380,078    7/1945    Schutte..........................210/71 X Primary Examiner—Jim L. De Cesare
Attorney—Morgan, Finnegan, Durham & Pine

[57] ABSTRACT

Wax is separated from a wax-oil mixture by centrifuging at a temperature below 30° C. and below the pour point of the mixture, by first of all agitating the mixture to render it mobile. The agitation, which should not reduce the wax crystal size below 50 microns, may be stirring for e.g. 1–120 minutes at e.g. 50–1000 r.p.m. with a superimposed beating or whisking set in. Preferably gas e.g. air is entrained with a 5–20 percent increase in volume. The centrifuging, preferably filtration centrifuging, may use forces of 150–3,500 G and times of 5 seconds – 15 minutes.

Preferred feedstocks are 250°–550° C. petroleum fractions, the 450°–550° C. fractions preferably having a gas oil diluent.

7 Claims, No Drawings

METHOD OF SEPARATION OF WAX FROM OIL

This invention relates to the separation of wax from oil by centrifuging.

The commonly used method of separating wax from oil, particularly separating wax from petroleum fractions, is solvent dewaxing, in which the wax-containing oil is chilled in the presence of a selective solvent for the oil and filtered. The use and recovery of the solvent makes the process relatively expensive. The separation of wax from oil by centrifuging has been proposed, but this sort of separation presents problems particularly when the wax content of the oil being treated and/or the temperature of separation is such that the wax-oil mixture is solid. The existence of solid wax-oil mixtures is not uncommon because the wax plays a predominant part in the solidification. For example a petroleum fraction boiling in the wax distillate range from a high wax content crude oil will be solid at atmospheric temperature (circa 20° C.) even when the oil content is around 70% wt and the wax content only 30 percent. At lower temperatures lower wax content mixtures will be solid also. Dealing with these problems by the use of lower boiling hydrocarbon diluents or solvents increases the volume of material being centrifuged and involves extra separation steps and hence increases the cost.

A simple method has now been found for treating normally solid wax-oil mixtures to separate wax from oil. According to the present invention a method of separating wax from oil by centrifuging at temperatures of 30° C. or below comprises subjecting a wax-oil mixture, which would normally be solid at the centrifuging temperature, to agitation to render it mobile without reducing the size of the wax crystals below 50 microns and thereafter centrifuging the mobile mixture.

The expression "which would normally be solid at the centrifuging temperature" means that the centrifuging is carried out at a temperature below the pour point of the wax-oil mixture.

The conditions necessary for the successful centrifuging of wax-oil mixtures have been investigated in the past, but the findings have not always been consistent. For example, U.K. Pat. specification No. 979,772 describes a method of removing wax from crude oil and residual oil fractions by centrifuging, in which prior to the centrifuging the oil is heated and cooled at a controlled rate to allow the wax to form large agglomerates and so facilitate centrifuging.

On the other hand, U.S. Pat. No. 3,278,413 subjects a wax-oil slurry, prior to centrifuging, to intensive agitation to break down the wax crystals to a size where the largest dimension is 5 to 20 microns.

In the present invention, the wax-oil mixture is agitated because the mixture would otherwise be solid and would not be capable of being centrifuged; however the agitation is carried out under conditions such that the wax crystals are not broken down. The term "without reducing the size of the wax crystals below 50 microns" means that the largest dimension is at least 50 microns and the term applies to the majority of the crystals. The size of the crystals can readily be determined and controlled by taking samples of the mixture and examining them under a microscope at a known magnification. Preferably the majority of the wax crystals have their largest dimension in the range 200 – 500 microns.

The feedstocks may be petroleum fractions having initial boiling points of 200° C. and above, particularly the so-called gas oil and wax distillate fractions boiling in the range 250° – 550° C. Particularly preferred fractions are those boiling in the range 250° – 450° C. In these preferred fractions the wax is predominantly paraffinic wax, i.e. wax formed of n-paraffins or only slightly branched paraffins. The wax in residue fractions boiling above 550° C. is predominantly micro-crystalline or iso-paraffin wax, and the 450° – 550° C. distillate fraction may also contain significant amounts of this type of wax. As the name implies this wax crystallizes out as small crystals and its separation by centrifuging is correspondingly more difficult.

In its preferred form and with the preferred distillate feedstocks, the process is operated without any additional solvents and diluents thereby making the process extremely simple. The use of a lower boiling hydrocarbon diluent e.g. gas oil boiling in the range 250° – 400° C. may be advantageous when treating fractions boiling above 450° because the diluent will cause the viscosity of the oil phase at the centrifuging temperature to be reduced and thereby enhance the separation of oil from wax and enable the wax to be separated in a more concentrated form.

It should be emphasized, however, that the amount of diluent should be such that the pour point of the mixture remains above the centrifuging temperature. This distinguishes the embodiment from the more conventional use of diluents or solvents where the mixture has a pour point below the centrifuging temperature. The diluent may be added before or after the agitation, preferably the latter.

The process is particularly suitable for fractions having wax contents of 15% wt or more for example fractions from Libyan and Nigerian crude oils. The practical upper limit is 50% wt of wax. Since the aforementioned crude oils have low sulphur contents they are suitable for producing fuel oil blending components and particularly so if some of the wax they contain can be simply and easily removed. The paraffinic nature of Libyan crude oil and the naphthenic nature of Nigerian crude oil is also of value in lubricating oil manufacture, again subject to the simple solution of the problems associated with their high wax content. The present process is suitable for reducing the wax content of certain lubricating oil fractions derived from high wax content crude oils to an intermediate level (10 – 20% wt), equivalent, for example, to the wax content of fractions derived from Middle East crude oils. Such fractions can then be processed into lubricating oils in conventional manner without the need for excessive amounts of solvents or specially adapted apparatus.

The agitation should, as stated above, be carried out under conditions which render the feedstock mobile. Preferably the agitation involves a beating or whisking action superimposed on simple stirring. This can be ensured, in known manner, by a suitable choice of stirring paddle. The wax-oil mixture may be stirred with stirrer speeds in the range 50 to 1,000 r.p.m. preferably 100 to 300 r.p.m. The time necessary for the agitation can be determined by observation or experiment and can be quite short. While longer periods are not necessary harmful they are wasteful of energy and in practice the period may be 1 – 120 minutes, preferably 1 – 60 minutes.

The wax-oil mixture is considered to be of suitable mobility when it has a creamy lump-free consistency, flows readily under gravity and is easily pumped. It is however important to use a pump which does not break the crystals, for example a flow inducer, a centrifugal pump or a plunger pump. Reciprocating pumps with valves are generally not suitable.

The agitation may be effected in the presence of a non-reactive gas, i.e. any gas which does not react readily with the feedstock at temperatures of 30° C. or below. Since wax-oil mixtures are relatively unreactive at these low temperatures a wide variety of gases can be used e.g. nitrogen, CO, $CO_2$, $H_2$ or, preferably, air.

During the agitation in the presence of a gas, the gas becomes entrained. Although this entrainment of gas is not essential it may be a factor in improving the separation of the wax and oil during the centrifuging. Preferably, the agitation is simply carried out in an open container, in which case air will be automatically entrained. Entrainment of gas increases the volume of the feedstock and preferably the amount of gas entrained is such that the mixture increases in volume by 5 to 20 percent, based on the volume of the original mixture.

The agitation may be started with the feedstock at the required centrifuging temperature of 30° C. or below. However, the feedstock may be passed to the agitation stage in liquid form (preferably at a temperature above its cloud point) to make transportation easy. If this is done, then the feedstock must be cooled till wax separates out and the required centrifuging temperature is reached.

It has been found that the rate of cooling from just above the cloud point temperature downwards to the point in time when the oil is cooled depends on the residence time in the centrifuge. At one end of the scale, with a short centrifuge residence time of 6–7 seconds it is desirable to cool the oil slowly and, preferably, to cool the oil to the desired temperature before the agitation. The cooling rate is preferably less than 1° C./hour. At the other end of the scale, with a centrifuge residence time of 5–10 minutes, it is possible to cool the oil more quickly. The cooling rate in this case may be as great as 14° C./hour. For residence times intermediate between these an intermediate cooling rate may be chosen. The extent to which the oil should be wholly or partly cooled before agitation is started can be determined by experiment. Since short agitation times are preferred, it is clearly preferable, with long cooling times, to carry out most of the cooling before agitation is started. In general it is desirable in the crystallization step to allow the wax to crystallize in the form of large, thin, plate-like crystals. The crystals habit of paraffin waxes has been the subject of considerable study and the literature contains much information on the formation of plate-like wax crystals. In particular see Crystal Behavior of Paraffin Wax by S.W. Ferris & H.C. Cowles I&EC Vol. 37 No. 11, p.1,054 – 1,062.

The centrifuge used may be a filtration or a sedimentation centrifuge, preferably the former because it gives waxes with lower oil contents. While a sedimentation centrifuge may be cheaper, it has the disadvantage that it will only operate with mixtures of relatively low solids content (about 7percent). With the present mixtures containing 20percent or more of wax it may be necessary therefore to recycle separated oil as a diluent, if a sedimentation centrifuge is used.

The centrifuge may be of a continuous or batch type, preferably the former. As indicated earlier the residence time may vary over a considerable range preferably from 5 seconds to 15 minutes. Suitable speeds for filtration centrifuges may range from 1,000 to 7,000 r.p.m. giving forces of 150 to 3,500 G. depending on the diameter of the centrifuge bowl. Preferred speeds are 1,000 to 3,000 r.p.m. giving forces of 150 to 1,000 G. The speed affects the filtration rate and in some cases the oil content of the separated wax. In a batch process, the centrifuging can be stopped when no more oil is separated: in a continuous process the rate of feed addition and product recovery for any particular operation can be determined by a preliminary experiment.

Preferably the centrifuging is carried out at room temperature (i.e. 10° – 25° C.) with no deliberate addition or extraction of heat. However lower temperatures down to −10° C. and consequently greater wax removal are possible. The feedstock may be chilled during the agitation by indirect heat exchange. If necessary a feedstock may be treated in two or more stages of decreasing temperature, for example a first stage separation at 10° – 25° C. followed by a further separation of the filtrate at 0° C. or below.

The wax separated is likely to contain some entrained oil and it can be worked up into purified wax by methods similar to those used for present day slack waxes.

The invention is illustrated by the following examples.

EXAMPLE 1

A wax distillate of Libyan origin was separated into fractions by distillation. The fractions were all solid at room temperature. The fractions were then separately agitated and centrifuged as follows:

800 grams of each fraction were heated to between 43° C. and 49° C. to dissolve all the wax in an open topped container equipped with an anchor type stirrer rotating at 300 r.p.m. Stirring was continued for 1 hour at a room temperature of 22° C. with no positive addition or removal of heat. At the end of the hour the wax-oil mixtures had cooled to 22° C. and increased in volume by up to 20percent due to air entrained by the stirring action. Despite being at room temperature they were still mobile. Each fraction was poured into a filtration centrifuge (a Basket 300 model manufactured by MSE Ltd). The filter bag used was made of close weave nylon cloth. The fractions were centrifuged at 3,000 G until no more oil was separated. Inspection data on the feedstocks and products was as shown in Table 1 below.

TABLE 1

| Feedstock | | | Wax product | | Oil product | |
|---|---|---|---|---|---|---|
| True boiling point range | Wax content, percent wt. | Pour point, °C. | Wax cake yield, percent wt. on feed | Oil content of wax cake, percent wt. | Pour point, °C. | Wax removed, percent of total wax |
| 350–460 | 37 | 35 | 22 | 15 | 21 | 51 |
| 360–507 | 32 | 43 | 28 | 30 | 21 | 61 |
| 385–520 | 31 | 46 | 27 | 30 | 12 | 61 |

The results show effective removal of at least half the wax with an improvement in pour point of 14° to 34° C. at room temperature and without the use of any solvents or diluents.

The wax content of the oil was measured as the amount of material precipitated from methylene chloride solution at −25° F. (−32° C.). A known weight of the mixture was dissolved in hot methylene chloride in a flask, the ratio of methylene chloride to mixture being 10:1. The solution was then cooled to −25° F. and held at that temperature for 30 minutes. The precipitated wax was separated by filtration, washed with methylene chloride until the filtrate was colorless, redissolved in petroleum ether, transferred to the original flask and weighed after evaporation of the petroleum ether. The oil content of the wax product was measured by dissolving 10 gms in 150 mls of methyl ethyl-ketone (MEK) cooling to −25° F. and then filtering on a No. 4 sintered glass disc also held at −25° F. The filtrate, after removal of MEK, yielded the oil content of the product wax.

EXAMPLE 2

The properties of a number of distillate fractions from Libyan crude oil treated by the process of this invention are given in Table 2 below.

TABLE 2

| Distillate reference | 1 Atmospheric gas oil | 2 Vacuum gas oil | 3 Wax distillate | 4 Wax distillate | 5 Wax distillate | 6 Wax distillate | 7 Wax distillate |
|---|---|---|---|---|---|---|---|
| Temperature in ° C. for percent volume distilled: | | | | | | | |
| 10 percent volume | 279 | 286 | 381 | 390 | 412 | 412 | 436 |
| 50 percent volume | 310 | 324 | 413 | 426 | 463 | 468 | 491 |
| 90 percent volume | 327 | 354 | 422 | 452 | 492 | 497 | 510 |
| Cloud point, °C. | 13 | 14 | 31 | 33 | | 39 | |
| Pour point, °C. | 10 | 13 | 27 | 32 | 43 | 38 | 46 |
| Wax content, percent weight | 24.8 | 21.0 | 28.0 | 36.7 | 32.4 | 35.5 | 31.3 |
| Melting point of wax, °C. | 29 | 37 | 46 | 48 | 54 | 57 | 57 |

In a series of experiments various of the distillate fractions described in Table 2 were heated at temperatures approximately 10° to 16° C. above their pour points until they were completely liquid and contained no undissolved wax crystals. The distillate fractions were then allowed to cool, crystallize and solidify in environments maintained at the desired centrifuging temperature. These temperatures are given in Table 3 below. The distillate fractions were allowed to stand at these temperatures for a total of 18 hours to ensure that they had attained thermal equilibrium with their environment. The solidified distillate fractions were then agitated for 2 minutes with a stirring and beating action at 200 r.p.m. until they were of a mobile creamy consistency, free from lumps, and contained approximately 10percent by volume of entrained air. The agitation was performed at the centrifuging temperature in each case. The mobile, agitated, aerated distillates were poured into a filtration centrifuge, a Basket 300 Model manufactured by MSE Ltd which contained a nylon filter bag as filtration medium. The centrifuge basket was rotating at 7,000 r.p.m. corresponding to a G force of 3,000. The time of centrifuging and yield of separated solids and filtrate oil in each case are given in Table 3 below. The results show that a substantial proportion of the total wax in each distillate was removed as a wax concentrate and that the filtrate oils were substantially lower in pour point than the original distillates.

TABLE 3

| Distillate reference | 1 | 3 | 4 | 5 | 6 | 7 |
|---|---|---|---|---|---|---|
| Centrifuging temperature, ° C | −7 | 24 | 24 | 24 | 24 | 24 |
| Quantity centrifuged, grams | 680 | 292 | 800 | 800 | 215 | 800 |
| Centrifuging time, minutes | 2¼ | 5 | 5 | 10 | 5 | 13 |
| Separated solids: | | | | | | |
| Yield, weight percent | 22.5 | 17.8 | 22.0 | 28.0 | 22.0 | 27.0 |
| Wax content, weight percent | 85.3 | 90.1 | 85.0 | 70.0 | 88.8 | 70.0 |
| Oil filtrates: | | | | | | |
| Yield, weight percent | 77.5 | 82.2 | 78.0 | 72.0 | 78.0 | 72.0 |
| Wax content, weight percent | 8.3 | 18.0 | 23.0 | 17.0 | 13.9 | 17.0 |
| Pour point, ° C | −7 | 18 | 24 | 21 | 16 | 18 |

EXAMPLE 3

In a series of pilot plant scale experiments various of the distillate fractions described in Table 2 of Example 2 were heated at temperatures 10° to 16° C. above their pour points until they were completely liquid and contained no undissolved wax crystals. The distillate fractions were then allowed to cool, crystallize and solidify in environments maintained at the desired centrifuging temperature. The temperatures are given in Table 4 below. The distillates were allowed to stand at these temperatures until they were in thermal equilibrium with their environments. The actual times were 18 hours for distillates 1 and 2 and 48 hours for distillates 4, 6 and 7. The solidified distillate fractions were then agitated in a Hobart AE 200 Beater mixer for two minutes at a combined beating and stirring speed of 89 r.p.m. and then for two minutes at a combined beating and stirring speed for 165 r.p.m. After agitation the distillates had a mobile creamy consistency, free from lumps, and contained approximately 15percent by volume of entrained air. The distillates, so treated, were then pumped by means of a flow inducer of the tubing type into a worm screen centrifuge Model H 200 manufactured by Siebtechnik G.m.b.H. The centrifuge was operated at a speed of 3,000 r.p.m. which corresponds to a G force of 1,000, and separated solids and oil filtrate were withdrawn continuously as the feed slurry was pumped in. The residence time of material in this centrifuge was approximately 6 seconds. The production rate of solids and filtrate and other data are given in Table 4 below.

Table 4 shows that a significant reduction in the wax content of the oils was obtained in all cases, giving oil products with lower pour points. The wax removal was greatest with the highest boiling distillates.

It will also be seen that the melting point of the wax removed was higher than that of the wax remaining in the oil, the difference being greatest with the highest boiling distillates. This means that the centrifuging was preferentially removing the waxes of greatest molecular weight.

TABLE 4

| Distillate reference | 1 | 2 | 4 | 6 | 7 |
|---|---|---|---|---|---|
| Centrifuging temperature, ° C | 4.5 | 4.5 | 22 | 22 | 22 |
| Feed rate, kg./hr | 140 | 152 | 58 | 42 | 33.5 |
| Separated Solids: | | | | | |
| Production rate, kg./hr | 11.4 | 22.7 | 24 | 18.2 | 18.2 |
| Wax content, percent weight | 73 | 54.5 | 60.7 | 51.5 | 43.9 |
| Melting point of wax, ° C | 35 | 42 | 51 | 56 | 61 |
| Oil Filtrates: | | | | | |
| Production rate, kg./hr | 124 | 129 | 33.5 | 23.6 | 15.4 |
| Wax content, percent weight | 22.4 | 14.7 | 17.1 | 12.8 | 15.9 |
| Melting point of wax, ° C | 28 | 35 | 42 | 50 | 50 |
| Pour point, ° C | 4.5 | 4.5 | 18 | 21 | 27 |

A substantial amount of oil was removed with the wax in the case of the highest boiling distillates, and the Example 4 hereafter shows the improvement obtainable by the use of a diluent with these high boiling feedstocks.

EXAMPLE 4

This example describes the use of a quantity of gas oil diluent to lower the liquid phase viscosity of a crystallized and agitated distillate just prior to the centrifuging step. Reducing the liquid phase viscosity prior to centrifuging improves the wax/oil separation, in a given time, so that a more concentrated waxy solid is separated.

Distillates 6 and 7 were cooled, crystallized, agitated and aerated as described in Example 3. Then just prior to pumping to the worm screen centrifuge used in Example 3 a proportion of distillate 2 was added and mixed.

The results of the centrifuging are given in Table 5 below. It can be seen, by comparing this data with those for distillates 6 and 7 in Table 4, that in each case the wax concentration in the separated solids is significantly increased. The viscosity of the oil filtrate from Distillate 6 in Table 4 was 90 cS at 22° C. whereas that from the Distillate 6 - Distillate 2 mixture in Table 5 was 22 cS, and the viscosity of the oil filtrate from Distillate 7 in Table 4 was 135 cS whereas the viscosity of the Distillate 7 - Distillate 2 filtrate in Table 5 was 38 cS.

TABLE 5

| Distillate reference | 6 and 2 | 7 and 2 |
|---|---|---|
| Feed rate, kg./hr | 41.3 of 6 plus 41.3 of 2. | 33.7 of 7 plus 16.4 of 2. |
| Centrifuging temperature,° C | 22 | 22. |
| Pour Point of mixture,° C | 27 | 38. |
| Production rate of separated solids, kg./hr | 12.3 | 12.3. |
| Wax content of separated solids, percent wt | 84.7 | 67.7. |
| Melting point of wax, °C | 59 | 61. |

EXAMPLE 5

This example shows the effect of the physical entrainment of air during the stage of agitating the crystallized distillate at a temperature below its pour point.

Distillate 6 was cooled and crystallized in the manner described in example 3. Part of the crystallized distillate was then agitated in the manner described in example 3, and then centrifuged after mixing with Distillate 2 as described in example 4. The other part of crystallized distillate 6 was agitated at the same speed but for half the time and with a different stirrer blade, with the result that the entrainment of air was kept to a minimum during the agitation. It was then centrifuged after mixing with Distillate 2. Results of the centrifuging of the aerated and non-aerated compositions are given in Table 6 below from which it can be seen that the aeration leads to a significant improvement in the wax concentration of the separated solids.

TABLE 6

| Distillate reference | 6 and 2 | |
|---|---|---|
| Feed rate, kg./hr | 41.3 of 6 plus 41.3 of 2. | |
| Air entrained in Distillate 6 component, percent volume | 5.0 | 16.5 |
| Production rate of separated solids, kg./hr | 14.1 | 12.3 |
| Wax content of separated solids, percent weight | 76.9 | 84.7 |
| Melting point of wax, ° C | 58 | 59 |

We claim:

1. A method of centrifugally separating wax from a wax-oil mixture whose pour point is such that the mixture is in a solid state at a temperature in the range of from $-10°$ to $30°$ C. comprising subjecting said wax-oil mixture in its solid state to agitation at said temperature while maintaining the largest dimension of a majority of the wax crystals of said mixture at a dimension of at least 50 microns during said agitation, and continuing said agitation until said mixture is rendered sufficiently mobile at said temperature to flow readily under gravity and be easily pumpable; subjecting the resultant mobile mixture to centrifuging under a centrifuging force of 150 to 3,500 G and at a centrifuging temperature which is below said pour point and is in said range, to centrifuge out oil from said mobile mixture and leave separated wax; and, recovering oil centrifuged out and separated wax, as product.

2. A method as claimed in claim 1 wherein the wax-oil mixture is a petroleum fraction boiling in the range $250°-550°$ C.

3. A method as claimed in claim 1 wherein the wax-oil mixture has a wax content of 20% to 30% by wt.

4. A method as claimed in claim 1 wherein the agitation is carried out by stirring at a speed of 50–1,000 r.p.m..

5. A method as claimed in claim 1 wherein the wax-oil mixture is agitated for 1 to 120 minutes.

6. A method as claimed in claim 1 wherein the centrifuging is filtration centrifuging.

7. A method as claimed in claim 1 wherein the centrifuging residence time is from 5 seconds to 15 minutes.

* * * * *